United States Patent
Nakayama

(10) Patent No.: US 6,396,659 B1
(45) Date of Patent: May 28, 2002

(54) MAGNETIC HEAD ASSEMBLY FOR A FLEXIBLE DISK DRIVE HAVING GROOVES FORMED IN THE CORE OF THE ERASE HEAD WHICH MOST CLOSELY ADJOINS THE PAIR OF CORES FORMING THE WRITE/READ HEAD

(75) Inventor: Makoto Nakayama, Gunma (JP)

(73) Assignee: NEC Corporation, Tokyo (JP)

( * ) Notice: Subject to any disclaimer, the term of this patent is extended or adjusted under 35 U.S.C. 154(b) by 1019 days.

(21) Appl. No.: 08/785,802

(22) Filed: Jan. 21, 1997

Related U.S. Application Data

(63) Continuation of application No. 08/427,819, filed on Apr. 26, 1995, now abandoned.

(30) Foreign Application Priority Data

Apr. 27, 1994 (JP) ............................................. 6-089269

(51) Int. Cl.⁷ .............................................. G11B 5/265
(52) U.S. Cl. ....................................................... 360/121
(58) Field of Search ................................. 360/119, 121, 360/118, 125, 126, 127

(56) References Cited

U.S. PATENT DOCUMENTS

| | | | | |
|---|---|---|---|---|
| 5,057,955 A | * | 10/1991 | Inagoya et al. | 360/125 |
| 5,138,508 A | * | 8/1992 | Matsuzawa et al. | 360/125 |
| 5,309,306 A | * | 5/1994 | Okada et al. | 360/121 |
| 5,450,264 A | * | 9/1995 | Nishimura et al. | 360/121 |

FOREIGN PATENT DOCUMENTS

| | | |
|---|---|---|
| JP | 62-287406 | 12/1987 |
| JP | 3-173908 | * 7/1991 |

\* cited by examiner

*Primary Examiner*—David Davis
(74) *Attorney, Agent, or Firm*—Young & Thompson

(57) ABSTRACT

In a magnetic head assembly for a flexible disk drive, a write/read head and an erase head are formed with grooves defining track widths only in I-shaped cores thereof. Erase track widths are dimensioned 53 μm to 63 μm each while a track width is dimensioned 125 μm to 135 μm. These dimensions correct the extension of magnetic fluxes from gaps. Hence, the assembly does not lower the reproduction output or erase the data of adjoining tracks, thereby insuring compatibility of magnetic recording media or disks.

4 Claims, 4 Drawing Sheets

MAGNETIC HEAD ASSEMBLY FOR A FLEXIBLE DISK DRIVE HAVING GROOVES FORMED IN THE CORE OF THE ERASE HEAD WHICH MOST CLOSELY ADJOINS THE PAIR OF CORES FORMING THE WRITE/READ HEAD

This application is a continuation of application Ser. No. 08/427,819, filed Apr. 26, 1995, now abandoned.

BACKGROUND OF THE INVENTION

1. Field of the Invention

The present invention relates to a magnet head assembly for a flexible disk drive and, more particularly, to a composite magnetic head having a write/read head and an erase head.

2. Description of the Related Art

Today, a flexible disk drive is extensively used as a storage for various kinds of electronic equipment including computers and word processors. A composite magnetic head assembly for use in the flexible disk drive is taught in, for example, Japanese Patent laid-Open Publication No. 62-287406. The assembly taught in this document has a write/read (W/R) head and an erase head. The W/R head and erase head are each made up of an L-shaped core and an I-shaped core adhered to each other. However, the assembly has a W/R track width and erase track widths formed simply by chamfering one of the two cores of the erase head. Hence, magnetic fluxes from the erase gaps extend to the outside of the erase track widths and thereby erase data over more than a predetermined width, i.e., erase much data written in a magnetic recording medium or disk by the W/R head. As a result, the reproduction output, i.e, S/N (Signal-to-Noise) ratio of the assembly is lowered. Moreover, such magnetic fluxes are apt to erase even data stored in adjoining tracks. This makes compatibility of disks impractical.

SUMMARY OF THE INVENTION

It is, therefore, an object of the present invention to provide a magnetic head assembly for a flexible disk drive and capable of preventing the erasure width from increasing and thereby ensuring compatibility of magnetic recording media or disks.

A magnetic head assembly of the present invention has a W/R head made up of a pair of first cores adhered to each other and having a coil opening. The W/R head has a first groove defining a W/R width and an erase head made up of a pair of second cores adhered to each other and having a coil opening. Only one of the second cores has second grooves defining a W/R track width and two erase track widths. The W/R head and erase head are constructed integrally with each other.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1A:
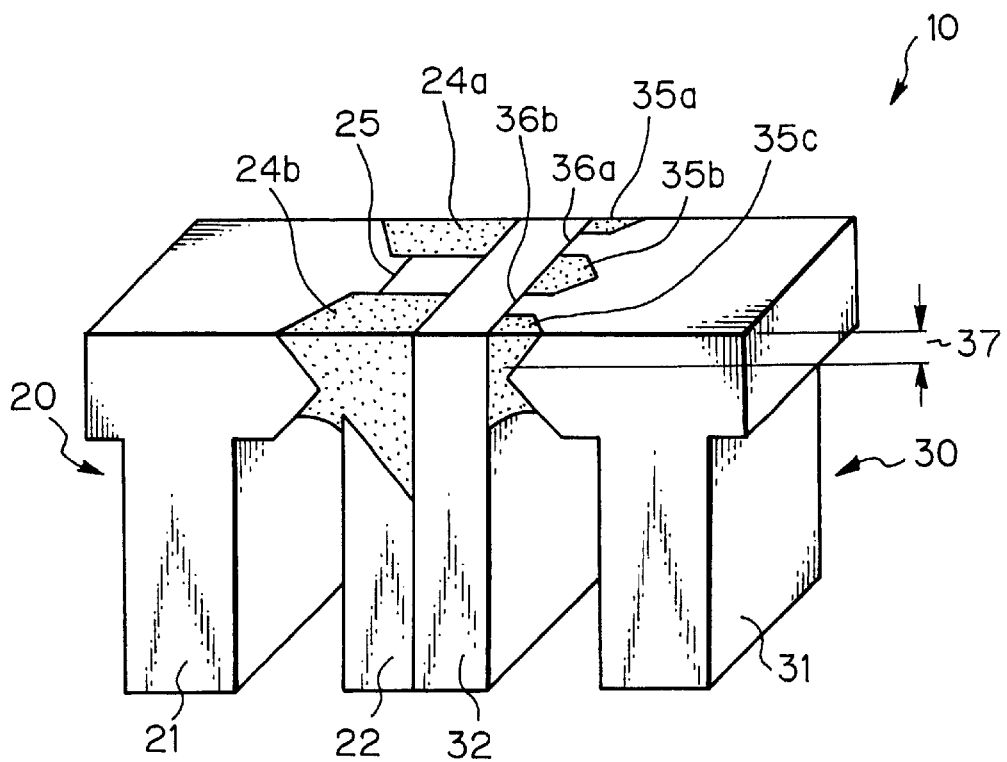
FIG. 1A is an external perspective view of a conventional magnetic head assembly.

To better understand the present invention, a brief reference will be made to a conventional magnetic head assembly for a flexible disk drive, shown in FIGS. 1A and 1B and disclosed in previously mentioned Laid-Open Publication No. 62-287406. As shown, the assembly, generally 10, has a write/read (W/R) head 20 and an erase head 30. The W/R head 20 is made up of an L-shaped core 21 and an I-shaped core 22 while the erase head 30 is made up of an L-shaped core 31 and an I-shaped core 32. The cores 21 and 22 are chamfered to provide a W/R width 23. Likewise, the core 31 is chamfered, or grooved, to provide erase track widths 33a and 33b and a W/R track width 34. The chamfered portions of the cores 21 and 22 are respectively filled with masses 24a and 24b of glass or similar nonmagnetic substance. The chamfered portions of the core 31 are also filled with masses 35a, 35b and 35c of glass or similar nonmagnetic substance. The core 32 of the erase head 30 is not provided with any groove. Hence, the erase track widths 33a and 33b are defined only by the core 31.

Figure 1B:
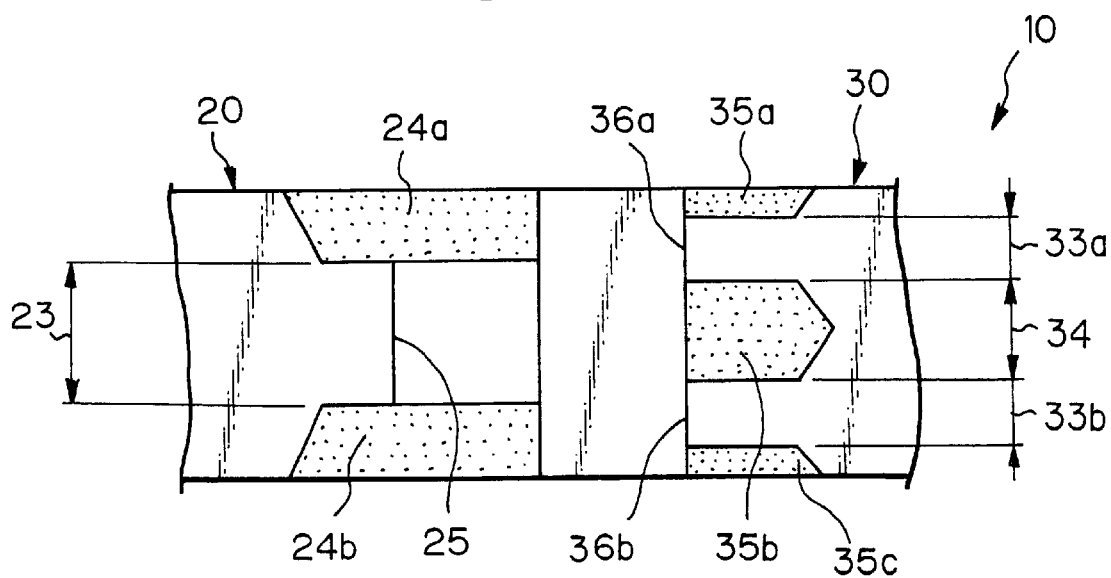
FIG. 1B is a plan view of the conventional assembly.

There are also shown in FIGS. 1A and 1B a W/R gap 25 included in the W/R head 20, erase gaps 36a and 36b included in the erase head 30, and an erase gap depth 37 defined in the core 31 in order to determine the erasure characteristic of head assembly 10.

Generally, for a magnetic head assembly for use in a flexible disk drive operable with 3.5-inch disks, the W/R width 23, W/R track width 34 and each erase track width 33a or 33b are respectively dimensioned 131 $\mu$m, 117 $\mu$m, and 71 $\mu$m (nominal values).

The conventional assembly 10 has the problem discussed earlier. Specifically, the W/R track width 34 and erase track widths 33a and 33b are defined only by the L-shaped core 31 of the erase head 30. Hence, magnetic fluxes from the erase gaps 36a and 36b extend to the outside of the erase track widths 33a and 33b and thereby erase data over more than a predetermined width, i.e., erase much data written in a medium or disk by the W/R head 20. As a result, the reproduction output, i.e, S/N ratio of the assembly 10 is lowered. Moreover, the magnetic fluxes are apt to erase even data stored in adjoining tracks. This makes compatibility of disks impractical.

Figure 2A:
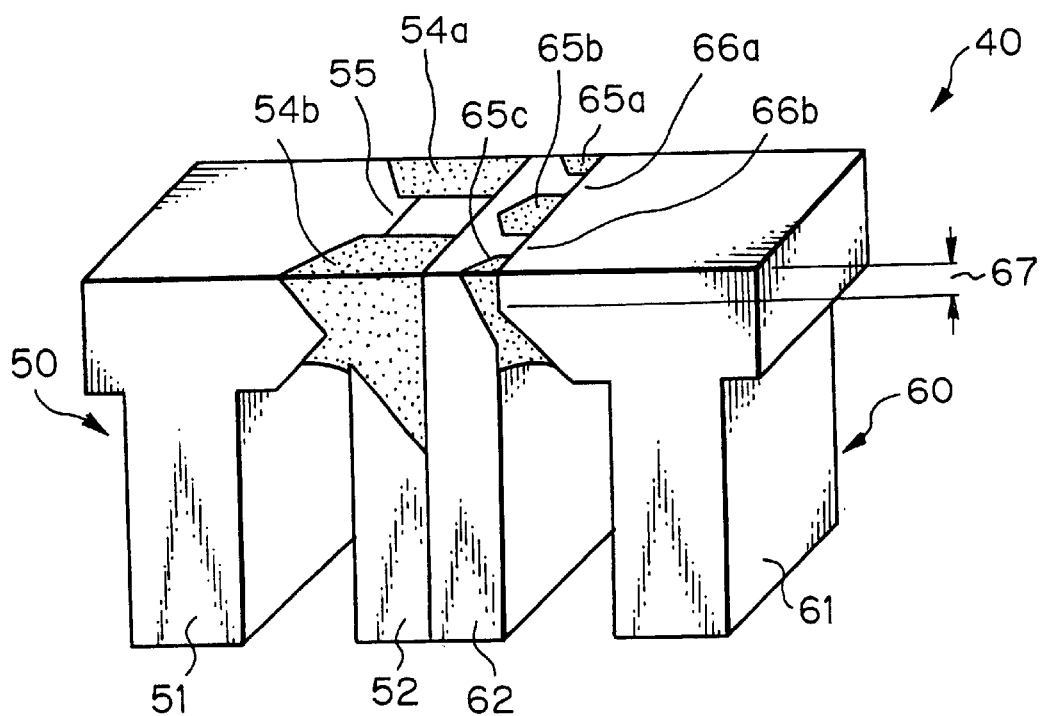
FIG. 2A is an external perspective view of a magnetic head assembly embodying the present invention.
Figure 2B:
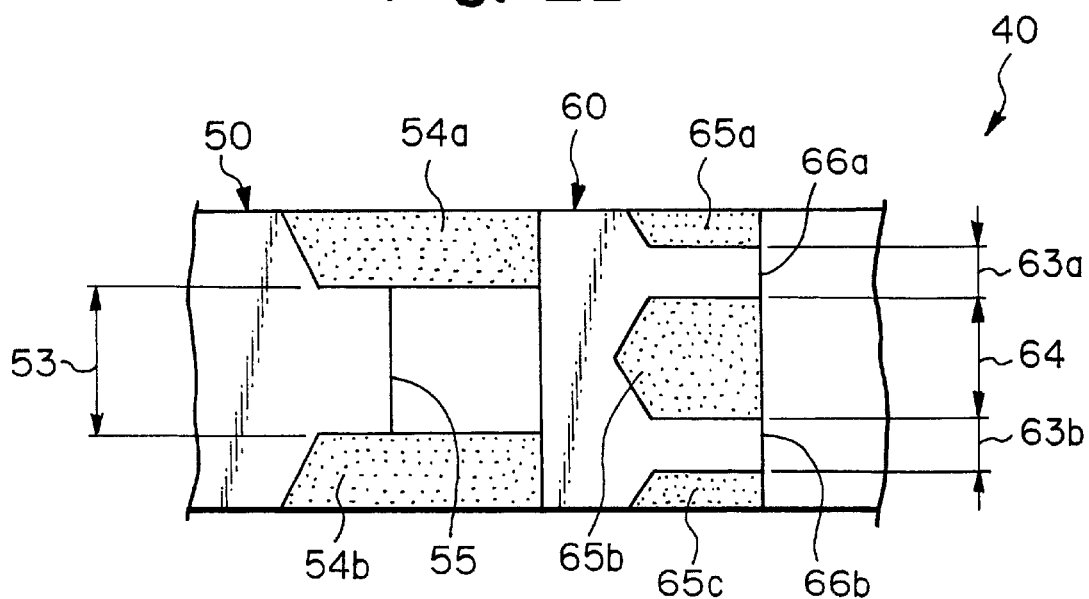
FIG. 2B is a plan view of the embodiment.

Referring to FIGS. 2A and 2B, a magnetic head assembly embodying the present invention is shown and generally designated by the reference numeral 40. As shown, the assembly 40 has a W/R head 50 made up of an L-shaped core 51 and an I-shaped core, 52 and an erase head 60 made up of an L-shaped core 61 and an I-shaped core 62. The cores 51 and 52 are chamfered to provide a W/R width 53 while the core 62 is chambered to provide erase track widths 63a and 63b and a W/R track width 64. The chamfered portions of the cores 51 and 52 are respectively filled with masses 54a and 54b of glass or similar nonmagnetic substance. Likewise, the chamfered portions of the core 62 are respectively filled with masses 65a, 65b and 65c of glass or similar substance.

On the other hand, the L-shaped core 61 of the erase head 60 is not chamfered at all. Hence, the erase track widths 63a and 63b and W/R track width 64 are defined only by the I-shaped core 62.

There are also shown in FIGS. 2A and 2B a W/R gap 55 included in the W/R head 50, erase gaps 66a and 66b included in the erase head 60, and an erase gap depth 67 defined in the core 61.

Figure 3:
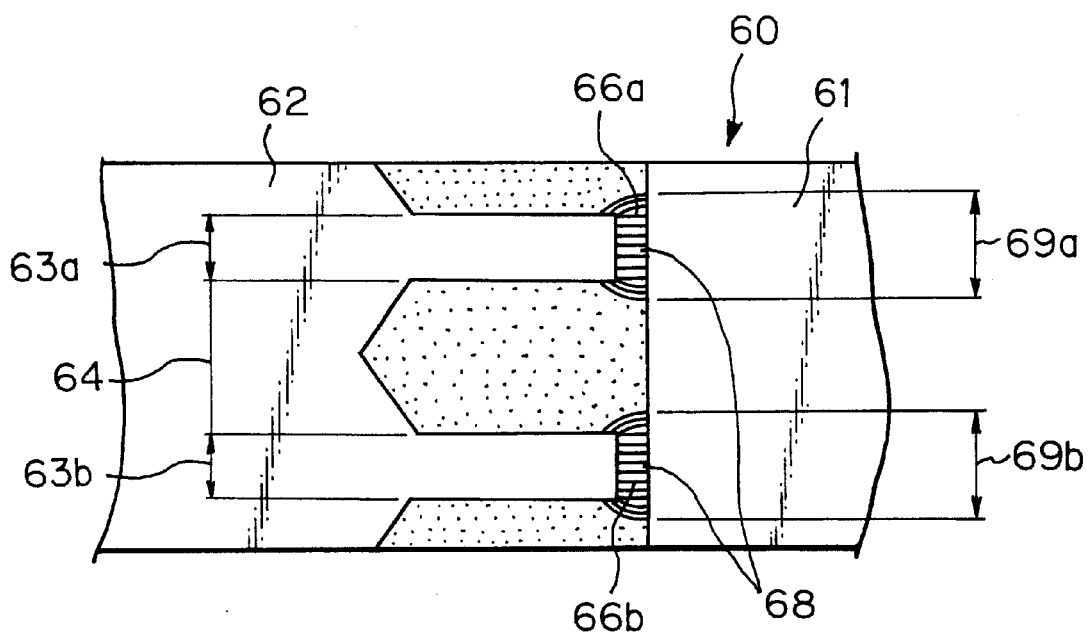
FIG. 3 is a view demonstrating the operation of the embodiment.

As shown in FIG. 3, when the erase head 60 is operated, a magnetic flux 68 is formed from each of the erase gaps 66a and 66b defined by the cores 61 and 62. Because the core 61 is not formed with a groove defining a track width, the fluxes 68 respectively extend over widths 69a and 69b which are broader than the erase track widths 63a and 63b.

Figure 4:
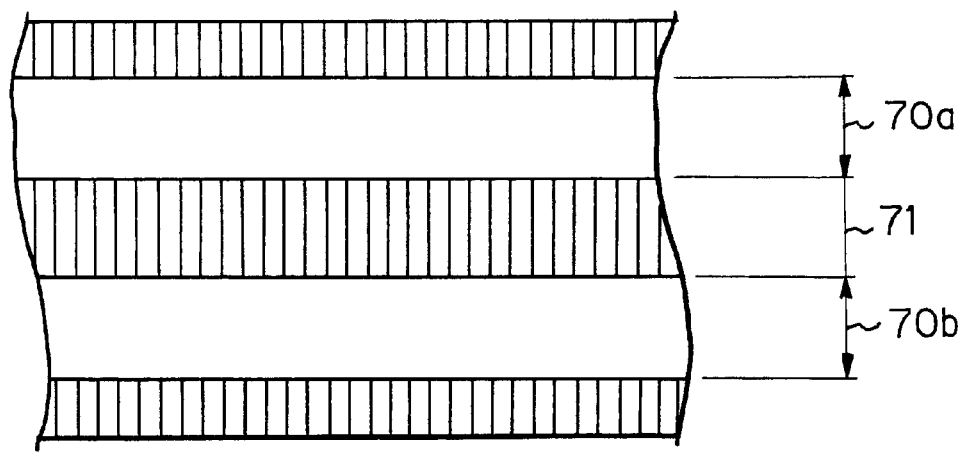
FIG. 4 shows a specific record pattern formed in a magnetic recording medium.

FIG. 4 shows a specific record pattern formed on a disk. Specifically, assuming that data are written in a disk over a write track width of 300 $\mu$m, FIG. 4 shows a record pattern erased by the erase head 60. As shown, the data are erased over widths 70a and 70b and are left over a width 71.

Figure 5:
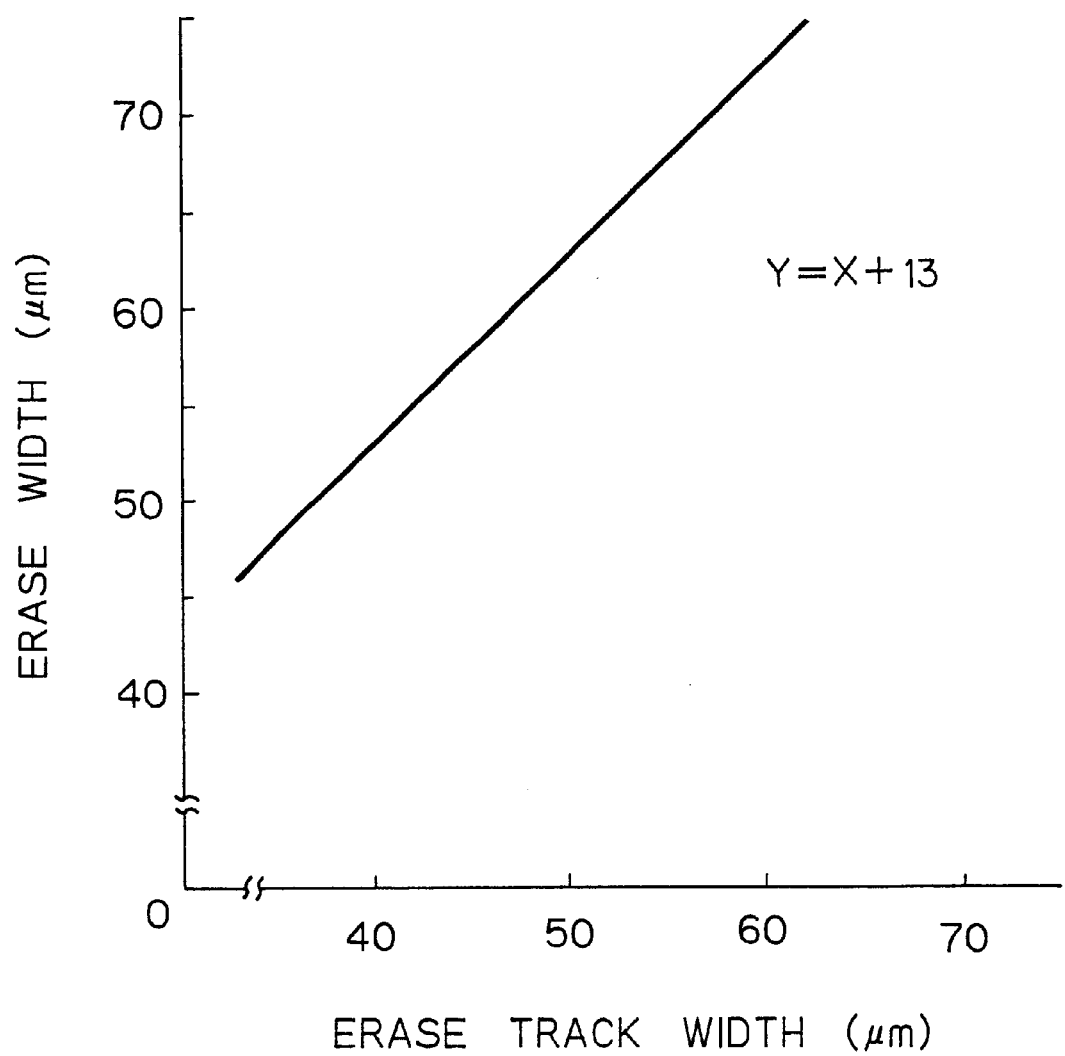
FIG. 5 is a graph indicative of a relation between an erase track width and an erasure width.

FIG. 5 is a graph representative of a relation between the erase track width and the erasure width, i.e., the results of experiments for implementing the relation stated above. As shown, the widths 70a and 70b over which the data are erased are about 13 $\mu$m greater than the erase track widths 63a and 63b, as represented by the following equation:

erasure width Y~erase track width X+13 ($\mu$m)

Assume that the assembly 40 is built in a flexible magnetic disk drive operative with a 3.5-inch disk, or magnetic recording medium, that the W/R track width and erase track width are respectively 117 $\mu$m and 71 $\mu$m, and that their scattering is ±5 $\mu$m as a tolerance particular to machining and assembly. Then, the W/R track width and erase track width mentioned above are achievable if the W/R track width 64 and each of the erase track widths 63a and 63b are respectively selected to be 125 $\mu$m to 135 $\mu$m and 53 $\mu$m to 63 $\mu$m.

The erase gap depth 67, FIG. 2A, is a critical factor that determines the erasure characteristic of the assembly 40. If the L-shaped core 61 is formed with the grooves defining the track widths, the portions corresponding to the depth 67 will be located inside of the masses 65a and 65b of nonmagnetic substance and not visible from the side of the core 61 due to the ridge of the I-shaped core 62. For this reason, it is preferable to chamfer the core 62.

In summary, it will be seen that the present invention provides a magnetic head assembly whose cores are so chamfered as to correct the extension of magnetic fluxes from erase gaps. The assembly, therefore, ensures an optimal track width and an optimal erase track width without increasing the amount of data to be erased. This successfully obviates the decrease in output (S/N ratio) and the erasure of data of adjoining tracks and thereby ensures compatibility of magnetic recording media.

Various modifications will become possible for those skilled in the art after receiving the teachings of the present disclosure without departing from the scope thereof.

What is claimed is:

1. A magnetic head assembly for erasing a first predetermined erase track width, and for leaving a first predetermined write/read track width, the assembly comprising:

a write/read head comprising a pair of first cores adhered to each other and having a coil opening, said write/read head having a first groove defining a write/read width; and an erase head comprising a pair of second cores adhered to each other and having a coil opening, only one of said pair of second cores having second grooves defining a write/read track width and two erase track widths, said second grooves of said erase head being formed in one of said pair of second cores which most closely adjoins said pair of first cores of said write/read head so that the first predetermined write/read track width is less than said write/read track width by a defined distance and so that the first predetermined erase track width is greater than each of said two erase track widths by said defined distance;

said write/read head and said erase head being constructed integrally with each other.

2. An assembly as claimed in claim 1, wherein said write/read track width is 125 $\mu$m to 135 $\mu$m while said two erase track widths are 53 $\mu$m to 63 $\mu$m each.

3. The assembly of claim 1, wherein said defined distance is about 13 $\mu$m.

4. The assembly of claim 3, wherein the first predetermined erase track width is 71 $\mu$m±5 $\mu$m and the first predetermined write/read track width is 117 $\mu$m±5 $\mu$m.

* * * * *